United States Patent
Thompson

(10) Patent No.: US 8,115,329 B2
(45) Date of Patent: Feb. 14, 2012

(54) WATER TURBINE WITH BI-SYMMETRIC AIRFOIL

(75) Inventor: David Stuart Thompson, Aberdeenshire (GB)

(73) Assignee: Rotech Holdings Limited, Aberdeen (GB)

( * ) Notice: Subject to any disclaimer, the term of this patent is extended or adjusted under 35 U.S.C. 154(b) by 831 days.

(21) Appl. No.: 11/914,757

(22) PCT Filed: May 18, 2006

(86) PCT No.: PCT/GB2006/001843
§ 371 (c)(1),
(2), (4) Date: Jun. 3, 2008

(87) PCT Pub. No.: WO2006/125959
PCT Pub. Date: Nov. 30, 2006

(65) Prior Publication Data
US 2008/0265583 A1    Oct. 30, 2008

(30) Foreign Application Priority Data
May 21, 2005    (GB) .................. 0510417.9

(51) Int. Cl.
*F03B 13/00*    (2006.01)
*H02P 9/04*    (2006.01)

(52) U.S. Cl. .............. 290/43; 416/223 R; 290/54

(58) Field of Classification Search ............ 290/54, 290/43; 60/641.7; 415/906, 908, 4.5, 4.1, 415/4.3; 416/223 R, 238, 241 R
See application file for complete search history.

(56) References Cited

U.S. PATENT DOCUMENTS

| | | | | | |
|---|---|---|---|---|---|
| 1,769,767 | A | * | 7/1930 | Caldwell | 416/131 |
| 2,043,736 | A | * | 6/1936 | Charavay | 416/238 |
| 2,160,467 | A | * | 5/1939 | Ward | 416/228 |
| 2,709,052 | A | * | 5/1955 | Berg | 244/35 R |
| 4,830,574 | A | * | 5/1989 | Wainauski et al. | 416/223 R |
| 5,112,192 | A | * | 5/1992 | Weetman | 416/201 A |
| 5,474,425 | A | * | 12/1995 | Lawlor | 416/223 R |
| 5,791,878 | A | * | 8/1998 | Wainauski et al. | 416/223 R |
| 6,068,446 | A | * | 5/2000 | Tangler et al. | 416/223 R |
| 6,104,097 | A |   | 8/2000 | Lehoczky | |
| 6,360,534 | B1 |  | 3/2002 | Denniss | |
| 7,768,145 | B2 | * | 8/2010 | Susman et al. | 290/54 |
| 2005/0001432 | A1 | * | 1/2005 | Drentham Susman et al. | 290/43 |
| 2005/0236841 | A1 | * | 10/2005 | Henriksen | 290/54 |

(Continued)

FOREIGN PATENT DOCUMENTS

CH    316900    10/1956

(Continued)

OTHER PUBLICATIONS

Search Report dated Feb. 2, 2006 for British Appln. No. GB0510417.9, filed May 21, 2005 (2 pgs.).

(Continued)

*Primary Examiner* — Julio Gonzalez
(74) *Attorney, Agent, or Firm* — Tarolli, Sundheim, Covell & Tummino LLP

(57) ABSTRACT

Known underwater turbine units suffer from problems, e.g. an ability to operate in ebb and/or flow tides. Accordingly, the invention provides aerofoil (5), wherein the aerofoil (5) is symmetrical about a mid-chord line (A) thereof. The aerofoil (5) may be symmetrical about a chord (B) thereof. The underwater turbine unit (3) comprises at least one turbine (25) which comprises at least one blade (20) which comprises the aerofoil (5).

108 Claims, 7 Drawing Sheets

U.S. PATENT DOCUMENTS

2007/0003403 A1 * 1/2007 Pedersen et al. ............... 415/4.1

FOREIGN PATENT DOCUMENTS

| EP | 1 467 091 A1 | 10/2004 |
|---|---|---|
| GB | 216113 | 10/1924 |
| GB | 626780 | 7/1949 |
| GB | 1047891 | 11/1966 |
| GB | 2028929 A | 3/1980 |
| GB | 2036870 A | 7/1980 |
| GB | 1574379 | 9/1980 |
| GB | 2 250 321 A | 7/1992 |
| JP | 520082244 A | 1/1977 |
| WO | WO 03/029645 A1 | 4/2003 |
| WO | WO 03029645 A1 * | 4/2003 |

OTHER PUBLICATIONS

Search Report dated Aug. 4, 2005 for British Appln. No. GB0510417.9, filed May 21, 2005 (3 pgs.).

* cited by examiner

WATER TURBINE WITH BI-SYMMETRIC AIRFOIL

FIELD OF INVENTION

The present invention relates to an improved aerofoil, a blade including such an aerofoil, a turbine including at least one of such blades, and to a turbine unit or apparatus particularly for underwater use including such a turbine. The invention also relates to a power generator including such a turbine and to a method of generating power using such a turbine. The invention particularly, though not exclusively, relates to a bi-symmetrical turbine blade which finds particular use in an underwater tidal and/or current driven turbine.

BACKGROUND TO INVENTION

Underwater power generators, e.g. for generating electrical power, and associated turbine units are known.

WO 03/029645 A1 (also by the present Applicant) discloses a power generator, such as an electrical power generator, comprising at least one underwater turbine unit including a housing having a liquid flow channel therethrough and at least one turbine means mounted in the flow channel for rotation in response to liquid flow through the channel. The turbine unit also comprises a pump means operatively coupled to the turbine means. The turbine unit provides a turbine unit part releasably mountable in the turbine unit, the part including at least one of the at least one turbine means and the pump means. In the disclosed embodiments the turbine unit part also comprises at least part of the flow channel.

The content of the aforementioned document is incorporated herein by reference.

Known tidal or current electrical power generators seek to address a need for increasing energy requirements in an environmentally friendly way. However, known generators suffer from a number of problems, e.g. relatively low efficiency of conversion of tidal and/or current flow to electrical energy.

So-called "symmetrical" aerofoils are known, and are employed for the stabilising surfaces of aircraft, such as the fin and tailplane, and also for wings of highly aerobatic aircraft which require the "lift" force to be high in both positive and negative directions. These aerofoils have zero "camber" or, in other words, a straight mean line which is clothed with a streamline form symmetrical about the mean line. Such a streamline form is asymmetrical fore and aft, with a blunt leading edge and a sharp trailing edge. This form has also been used for ships hulls. Conventionally, the leading edge or "entry" has been easier to design than the rearward curves or "run" of a ship's hull. This reflects the generally accelerating flow with falling pressure at the front, whereas the flow must decelerate towards the trailing edge and the rising pressure there tends to force a "separation" of the flow from the surface. The resulting chaotic wake gives very high drag, and where aircraft wings are concerned, a collapse of lift.

A wide variety of aerofoil forms have been developed and investigated throughout the last century. Systematic design philosophies were developed by NACA in particular, using families of streamline shapes to clad camber lines of varying curvature. Even when the camber is zero and the camber line just a straight line, the empirical streamline shapes vary in the position of maximum thickness and the relative size of the leading edge.

It is an object of at least one embodiment of at least one aspect of the present invention to obviate or at least mitigate one or more problems in the prior art.

It is a further object of one or more embodiments of at least one aspect of the present invention to provide an underwater turbine unit which, in use, is driven by tidal and/or current flow, and which can preferably operate in ebb and/or flood tides without a need for movement or realignment into a tidal flow direction.

It is a yet further object of at least one embodiment of at least one aspect of the present invention to provide a power generator apparatus or farm which is substantially or wholly underwater, thereby minimising environment impact.

It is a still further object of at least one embodiment of at least one aspect of the present invention to provide a power generator apparatus wherein maintenance may be carried out without diver or ROV (Remotely Operated Vehicle) intervention.

It is a further object of at least one embodiment of at least one aspect of the present invention to provide an aerofoil form which is capable of relatively high lift and low drag with flow approaching from either direction.

It is a further object of at least one embodiment of at least one aspect of the present invention to provide an aerofoil suited to use in a turbine for tidal or current energy extraction, e.g. where reversing tides present flow from substantially opposing directions.

It is a further object of at least one embodiment of at least one aspect of the present invention to provide an aerofoil form suited to energy extraction where flow periodically changes direction.

It is a further object of at least one embodiment of at least one aspect of the present invention to provide a bi-directional aerofoil form with relatively low drag and good structural rigidity, tolerant of a relatively wide range of incident flow angles.

It is a further object of at least one embodiment of at least one aspect of the present invention to provide a design procedure teaching for generating a family of aerofoils having their maximum thickness tailored to the structural duty, by scaling of a basic profile.

It is a further object of at least one embodiment of at least one aspect of the present invention to provide a teaching for a procedure for generating a family of aerofoils whereby a novel basic aerofoil is designed to give favourable velocity distributions at a required thickness as a basis for a bi-symmetrical reflected profile.

SUMMARY OF INVENTION

According to a first aspect of the present invention there is provided an aerofoil wherein the aerofoil is symmetrical about a mid-chord line thereof.

Herein, by mid-chord line is meant a line extending heightwise or breadthwise from substantially halfway along a chord of the aerofoil.

Preferably the aerofoil is symmetrical about a chord thereof.

Such an aerofoil may therefore be said to be bi-symmetrical.

Preferably the aerofoil comprises first and second leading edges.

Preferably each leading edge is part circular in shape.

Preferably the chord of the aerofoil comprises a straight line. In other words a camber of the aerofoil is zero, and a camber line comprises a straight line. Preferably the mid-chord line is substantially perpendicular to the chord.

Preferably a height of the aerofoil is greatest at or around the mid-chord line, reducing towards either end.

Preferably a ratio of mid-chord line height or thickness to chord length is around 5% to 25%, most preferably 12% to 20%, and advantageously substantially 15%.

Most preferably a position of maximum height or thickness of the aerofoil is substantially at the mid-chord line, i.e. 50% along the chord.

An advantageous implementation of the present invention provides a bi-symmetrical aerofoil with zero camber and maximum height or thickness at mid-chord.

Most preferably the aerofoil shape comprises a NACA 67, particularly a NACA $67_1$-015, leading edge shape reflected about a mid-chord line.

According to a second aspect of the present invention there is provided a blade comprising at least one aerofoil according to the first aspect of the present invention.

Preferably the blade, comprises a plurality of aerofoils (or design sections, e.g. longitudinally spaced sections) according to the first aspect of the present invention, for example, in the range of 3 to 9, and preferably 5.

Preferably a taper ratio, i.e. tip chord to hub chord ratio, may be in the range 0.3 to 0.8, and preferably around 0.5.

Preferably an aspect ratio, i.e. mean chord to blade height ratio, may be in the range 3 to 10, and preferably around 6.

Preferably a hub setting angle may be in the range 30° to 60° from an axial direction, and preferably around 45° or 48°.

Preferably a tip setting angle may be in the range 70° to 85° from an axial direction, and preferably around 79°.

Preferably a blade chord length at mid height may be in the range 0.3 m to 3.0 m, and preferably around 1.0 m.

According to a third aspect of the present invention there is provided a turbine, propeller or impeller comprising at least one blade according to the second aspect of the present invention.

The turbine may comprise a plurality of blades, e.g. in the range 2 to 9 blades, preferably 3 to 7 blades, in advantageous implementations 5 or 7 blades.

Preferably a ratio of hub diameter to tip diameter may be in the range of 0.1 to 0.5, and preferably around 0.2.

Preferably a tip diameter may be in the range 5 m to 30 m, and preferably around 15 m to 20 m.

The turbine may be adapted to rotate, in use, at a rate of 10 rpm to 50 rpm, and preferably around 25 rpm.

According to a fourth aspect of the present invention there is provided a turbine comprising at least one blade, wherein the at least one blade comprises an aerofoil, the aerofoil being symmetrical about a chord line thereof.

The turbine of the fourth aspect may optionally include any of the features of the turbine of the third aspect or the blade of the second aspect, or the aerofoil of the first aspect.

According to a fifth aspect of the present invention there is provided a turbine unit such as an underwater turbine unit or apparatus comprising at least one turbine according to either of the third or fourth aspects of the present invention.

Preferably the turbine unit includes a housing having a fluid or liquid flow channel therethrough and at least one turbine according to the third or fourth aspects of the present invention mounted in the flow channel for rotation in response to liquid flow through the flow channel.

The flow channel may comprise a venturi, e.g. a convergent-divergent venturi, tapering from openings at either end of the flow channel towards an inner part of the flow channel. This arrangement may, in use, provide a zone of acceleration for fluid flow through the flow channel.

The housing may be substantially symmetrical about a mid-point location thereof, and the at least one turbine may be located substantially thereat.

The liquid may be provided from a body of water within which the turbine unit is submerged.

The turbine housing may comprise an inner housing sleeve, and optionally an outer housing sleeve, which inner sleeve defines the flow channel.

The housing may be secured to an underwater surface by a mounting structure and may be substantially aligned with a direction of tidal (tidal stream) or current flow.

An angle between an axial direction of the housing and a direction of tidal or current flow may be around 0° to 45°, and preferably between 0 to 22°, and beneficially around 0°.

The turbine unit may provide a part releasably mountable in the turbine unit. The part may include at least one of the turbine and the pump means.

The turbine unit part may include at least a part of the housing, e.g. at least part of the flow channel, which may comprise at least part of the inner housing sleeve.

Preferably the turbine unit may be driven, i.e. the turbine may be caused to rotate, in use, in response to fluid (e.g. tidal and/or current) flow in either direction through the flow channel. In other words the turbine unit may work in both ebb and flood tides. The turbine may rotate in a first direction of rotation in a first direction of tidal flow, and the turbine may rotate in a second, opposite, direction of rotation in a second, opposite direction of tidal flow.

Preferably an inlet and/or outlet (exit) diameter of the flow channel or duct may be in the range 7 m to 40 m, and preferably around 20 m.

Preferably a length of the flow channel or duct may be in the range 7 m to 50 m, and preferably around 28 m.

According to a sixth aspect of the present invention there is provided a part releasably mountable in the turbine unit of the fifth aspect of the present invention.

According to a seventh aspect of the present invention there is provided a power generation apparatus, such as an underwater power generation apparatus, comprising at least one turbine unit or apparatus according to the fifth aspect of the present invention.

Most preferably the power generation apparatus comprises an electrical power generator.

Preferably, the power generation apparatus may further comprise:
- a pump means operatively coupled to the at least one turbine;
- a generator means driven by the turbine, and optionally located separately from the at least one turbine unit; and
- a fluid supply means coupling the pump means to the generator means for supplying fluid from the pump means to the generator means for generating power.

The fluid may comprise the liquid.

The power generation apparatus may be adapted to produce electrical power as alternating current/voltage (AC) or direct current/voltage (DC).

According to an eighth aspect of the present invention there is provided a method of generating power comprising the steps of:
- providing a power generation apparatus according to the seventh aspect of the present invention;
- locating the at least one turbine unit of the power generation apparatus underwater;
- causing the at least one turbine of the at least one turbine unit to rotate in response to fluid flow in at least one direction.

Preferably the at least one turbine unit is located on, near, or above a sea bed, ocean floor, river bed or the like.

Preferably the fluid flow may comprise tidal flow, e.g. of ebb and/or flood tides, tidal stream flow, or current flow.

Preferably the at least one turbine rotates in one direction in response to fluid flow in one direction and the at least one turbine rotates in another or counter direction in response to fluid flow in another direction.

The one direction and the another direction of fluid may be at least partly opposite in direction, and may be substantially opposed in direction, e.g. the one direction may be a direction of an ebb tide flow and the another direction may be a direction of a flood tide flow.

According to a ninth aspect of the present invention there is provided an underwater turbine unit comprising at least one turbine, the turbine comprising at least one blade, the at least one blade comprising an aerofoil which is symmetrical about a mid chord line thereof.

The aerofoil is beneficially symmetrical about a chord line thereof. In other words, the aerofoil may be "bi-symmetrical".

The underwater turbine unit may include a housing having a fluid or liquid flow channel therethrough, the flow channel optionally and advantageously providing a venturi or acceleration zone, the at least one turbine being mounted in the flow channel for rotation in response to fluid flow through the flow channel.

A cord of the aerofoil at a hub of the turbine may be between 30° and 60° substantially to a flow direction through the flow channel or axis of rotation of the turbine.

BRIEF DESCRIPTION OF DRAWINGS

Embodiments of the present invention will now be described by way of example only, and with reference to the accompanying drawings, which are.

DETAILED DESCRIPTION OF DRAWINGS

Figure 1:
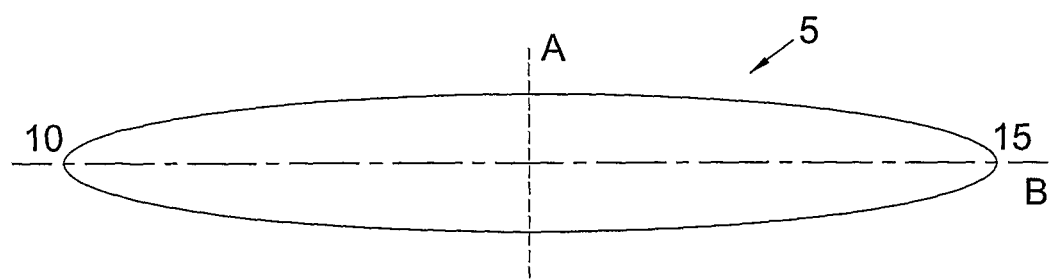
FIG. 1 a cross-sectional side view of an aerofoil according to an embodiment of the present invention.

Referring initially to FIG. 1 there is shown an aerofoil, generally designated 5, according to an embodiment of the present invention. The aerofoil 5 is symmetrical about a mid-chord line A thereof. Herein by mid-chord line A is meant a line extending height wise (or width wise) from substantially half way along a chord B of the aerofoil 5. In this embodiment, the aerofoil 5 is also symmetrical about the chord B. The aerofoil 5 may therefore be said to be "bisymmetrical".

The aerofoil 5 comprises first and second leading edges 10,15, each leading edge 10,15 being part circular in shape.

The chord B of the aerofoil 5 comprises a straight line. In other words a camber of the aerofoil 5 is zero, and a camber line comprises a straight line. The mid-chord line A can be seen to be perpendicular to the chord B. Further a height of the aerofoil 5 is greatest at or around the mid-chord line A, reducing towards either end, that is, towards each leading edge 10,15. A ratio of mid-chord line height or thickness to chord length is typically around 5% to 25%, more typically between 12% and 20%, and in this embodiment around 15%. Further, the position of maximum height or thickness of the aerofoil 5 is substantially at the mid-chord line A, i.e. around 50% of the way along the chord B. The present embodiment of the aerofoil 5 therefore provides a bisymmetrical aerofoil 5 with zero camber and maximum height or thickness at midchord.

The shape of the aerofoil 5 in a preferred implementation of this embodiment comprises a NACA 67 series profile, particularly a NACA $67_1$-015, leading edge shape reflected about a mid-chord line.

Figure 2:
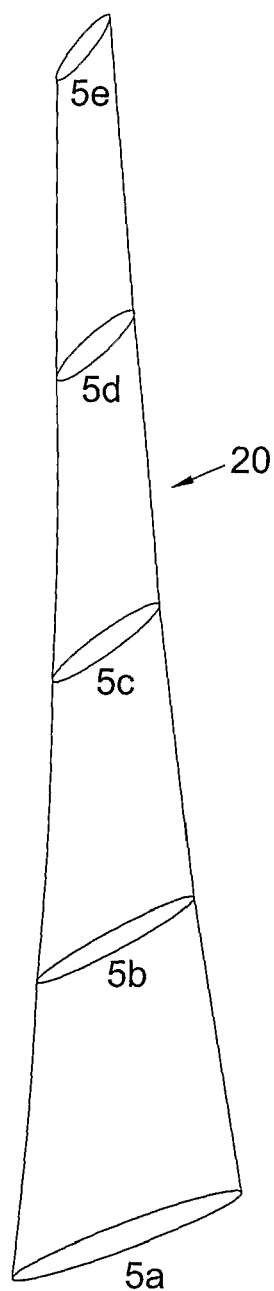
FIG. 2 a perspective view from one side and one end of a blade comprising an aerofoil according to FIG. 1.

Referring now to FIG. 2, there is illustrated a blade 20 comprising at least one aerofoil 5. The blade 20 comprises a plurality of aerofoils (or longitudinal spaced design sections) 5a to 5e, for example, in the range of 3 to 9 design sections, and preferably as shown in FIG. 2, 5 design sections.

A taper ratio, i.e. tip chord to hub chord ratio can be in the range of 0.2 to 0.8, and in this embodiment around 0.5. An aspect ratio, i.e. mean chord to blade height ratio, can be in the range of 3 to 10, and in this embodiment around 5. A hub setting or stagger angle can be in the range of 30° to 60° from axial direction, and in this embodiment around 45° or 48°. A tip setting or stagger angle can be in the range of 70° to 85° from an axial direction, and in this embodiment around 79°. It will therefore be appreciated that between hub and tip the blade 20 is typically twisted. A blade chord length at midheight can be in the range of 0.3 metres to 3 metres, and in this embodiment around 1 metre.

Figure 3:
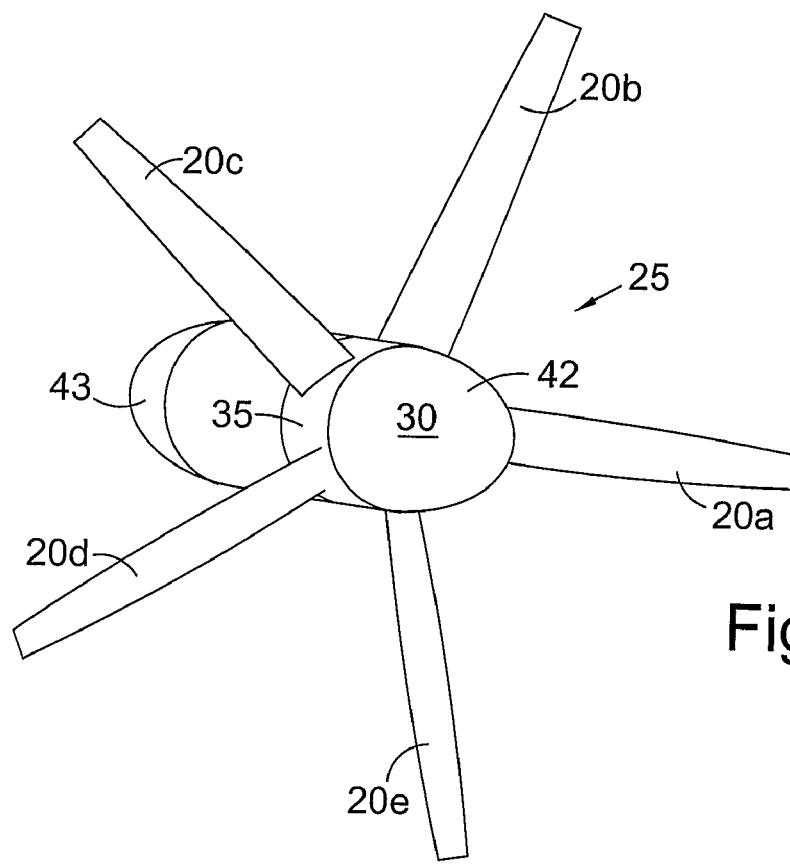
FIG. 3 a perspective view of a turbine comprising a plurality of blades according to FIG. 2.

Referring now to FIG. 3 there is illustrated a turbine, generally designated 25, comprising at least one blade 20. In this embodiment the turbine 25 comprises a plurality of blades 20a to 20e, for example, in the range 2 to 9 blades and typically in the range 3 to 7 blades, and in this advantageous implementation, 5 blades—although in an alternative advantageous implementation, 7 blades may be provided. The turbine 25 comprises a hub structure 30 upon which is mounted a rotating hub 35 from which the blades 20a to 20e outwardly and radially extend.

A ratio of hub diameter to tip diameter is in the range 0.1 to 0.5, and in this embodiment around 0.2. A tip diameter is in the range 5 metres to 30 metres, and in this embodiment around 15 metres. Further the turbine 25 is adapted to rotate in use at a rate of around 10 rpm to 50 rpm, and in this embodiment at around 25 rpm.

Figure 4:
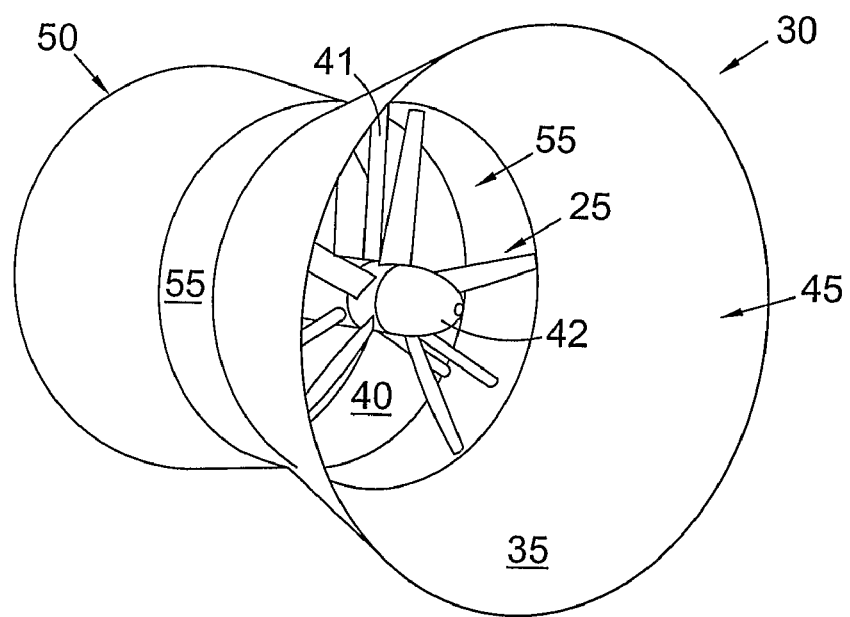
FIG. 4 a perspective view of an underwater turbine unit comprising a turbine according to FIG. 3.

Referring now to FIG. 4, there is illustrated a turbine unit, and particularly an underwater turbine unit or apparatus, generally designated 30, comprising a turbine 25. The turbine unit 30 includes a housing or duct 35 having a liquid or fluid flow channel 40 therethrough and at least one turbine 25 mounted in the flow channel 40 for rotation in response to liquid/fluid (water) flow through the flow channel 40. The flow channel 40 defines a flow restriction which comprises a venturi comprising a convergent-divergent venturi, tapering from openings 45,50 at either end of the flow channel 40 towards an inner part 55 of the flow channel 40. The housing 35 is substantially symmetrical about a mid-point location 55 and the turbine 25 is located substantially at the mid-point location 55 within the flow channel 40. The turbine unit 30 also includes a support structure for supporting the turbine unit 30 upon a seabed, ocean floor, riverbed, or the like, which support structure is not shown in FIG. 4. The liquid for driving the turbine 25 is provided from a body of water within which the turbine unit 30 is submerged—e.g. sea water.

As shown in FIG. 4 the housing or duct 35 comprises a single sleeve. In such implementation the housing or duct 35 has a narrowed or reduced waist on an outer surface thereof between ends thereof, and in this case, substantially mid-way between the ends thereof. However, in a modified implementation the turbine housing 35 can comprise an outer housing sleeve and an inner housing sleeve which inner sleeve defines the flow channel 40.

In use the housing 35 can be secured to an underwater surface by a support or mounting structure (not shown) and substantially aligned to a direction of predicted tidal or current flow. The angle between the actual direction of the housing 35 and the direction of tidal or current flow can be between 0° to 45°, and in this embodiment typically around 0°.

An inlet and/or outlet diameter of the flow channel 40 can be in the range 7 metres to 40 metres, and in this embodiment typically around 20 metres. The length of the flow channel 40 or duct can be in the range 7 metres to 50 metres, and typically in this embodiment around 28 metres. As can be seen from FIG. 4, the turbine unit 30 also includes support struts 41 for supporting the turbine 25 within the duct 35. Further, the stationary hub 30 comprises a nose cone 42 and tail cone 43.

Figure 5:
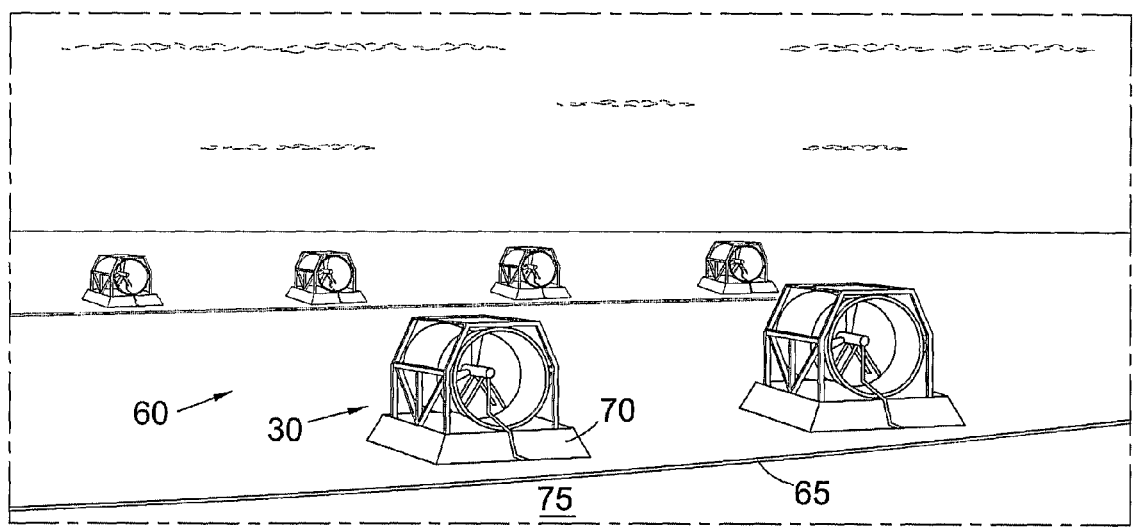
FIG. 5 a schematic view of an underwater power generation apparatus according to a first embodiment of the present invention comprising a plurality of turbine units according to FIG. 4.

Referring now to FIG. 5, there is illustrated a power generation apparatus, generally designated 60, comprising a plurality of turbine units 30 operatively linked or connected by electrical cable 65. Each of the turbine units 30 includes a supporting structure 70 for locating the respective turbine unit 30 on seabed 75. The power generation apparatus 60 comprises in the embodiment an electrical power generator. The power generation apparatus 60 comprises within each turbine unit 30: a pump means operatively coupled to the at least one turbine 25; a generator means (not shown) driven by the turbine 25 and optionally located separately from the at least one turbine unit 30; and a fluid supply means coupling the pump to the generator means for supplying fluid from the pump means to the generator means for generating power. The fluid optionally and advantageously comprises the liquid within which the turbine units 30 are submerged.

The power generation apparatus 60 can be adapted to produce electrical power as alternating current (AC) or direct current (DC).

In use the generation apparatus 60 is employed in a method of generating power. The method comprises the steps of:
providing the power generation apparatus 60;
locating each turbine unit 30 of the power generation apparatus 60 underwater; and
causing the at least one turbine 25 of the at least one turbine unit 30 to rotate in response to fluid flow in at least one direction, and preferably in both tidal flow directions.

The at least one turbine unit 30 is located on a seabed, ocean floor, river bed or the like as can be seen from FIG. 5. The fluid flow comprises tidal flow or stream, e.g. ebb and/or flow tides or alternatively current flow. The at least one turbine 25 rotates in one direction in response to fluid flow in one direction and in another or counter direction in response to fluid flow in another direction. The one direction and another direction of fluid flow can be at least partly opposite in direction and may be substantially opposite in direction, e.g. one direction may be a direction of an ebb tide flow and the other direction may be the direction of a flood tide flow.

The requirement to operate equally well in both directions forces a compromise in aerofoil design—in effect a choice between two leading edges back to back or two trailing edges back to back. Although a thin trailing edge is considered important for low drag, a thin leading edge will not tend to tolerate variations in incidence angle and it is important that aerofoils should not stall at incidence angles of at least 5° degrees and preferably up to 10°. The aerofoil 5 therefore has a rounded leading edge and the drag will be minimised by limiting the maximum thickness.

The maximum thickness is located at the mid-point of the aerofoil 5 at 50% chord, which makes it a very unusual aerofoil 5 for low speed applications. The leading edge geometry is not arbitrary. Calculations using an Eppler aerofoil design and analysis program showed that a simple stretched ellipse would likely not be satisfactory, even when the leading edges were enlarged. Eppler R, "Aerofoil Design and Data" Springer, 1991.

A standard aerofoil leading edge can be selected, but the choice is restricted because almost all previously published aerofoils have their maximum thickness ahead of mid-chord. The NACA 67-series aerofoils do, however, meet this requirement, using the basic thickness form designated NACA $67_1$-015. Such have a maximum thickness of 15% which offers a low overall drag together with reasonable spar depth. The aerofoil 5 is one of those designed to achieve a large region of laminar flow, which will not be relevant at the likely operating Reynolds numbers, but the smoothly developing flow which this design process achieves nevertheless ensures good boundary layer development together with tolerance of flow at incidence. As the bi-symmetrical aerofoil 5 has no camber, all the lift must be produced by operating at non-zero incidence.

The disclosed embodiment of this novel aerofoil 5 is therefore based on the front half of NACA $67_1$-015, reflected about the 50% chord line. In the course of the analysis, it was found necessary to add extra definition points on the leading and trailing edge circles. The coordinates of the aerofoils shape are specified in Table 1 below:

TABLE 1

Coordinates of the bi-symmetrical Aerofoil 5:

| x % c | $y_u$ % c | $y_l$ % c |
|---|---|---|
| 0.000 | 0.000 | 0.000 |
| 0.100 | 0.559 | −0.559 |
| 0.300 | 0.937 | −0.937 |
| 0.500 | 1.167 | −1.167 |
| 0.750 | 1.394 | −1.394 |
| 1.250 | 1.764 | −1.764 |
| 2.500 | 2.395 | −2.395 |
| 5.000 | 3.245 | −3.245 |
| 7.500 | 3.900 | −3.900 |
| 10.000 | 4.433 | −4.433 |
| 15.000 | 5.283 | −5.283 |
| 20.000 | 5.940 | −5.940 |
| 25.000 | 6.454 | −6.454 |
| 30.000 | 6.854 | −6.854 |
| 35.000 | 7.155 | −7.155 |
| 40.000 | 7.359 | −7.359 |
| 45.000 | 7.475 | −7.475 |
| 50.000 | 7.497 | −7.497 |
| 55.000 | 7.475 | −7.475 |
| 60.000 | 7.359 | −7.359 |
| 65.000 | 7.155 | −7.155 |
| 70.000 | 6.854 | −6.854 |
| 75.000 | 6.454 | −6.454 |
| 80.000 | 5.940 | −5.940 |
| 85.000 | 5.283 | −5.283 |
| 90.000 | 4.433 | −4.433 |
| 92.500 | 3.900 | −3.900 |
| 95.000 | 3.245 | −3.245 |
| 97.500 | 2.395 | −2.395 |

TABLE 1-continued

Coordinates of the bi-symmetrical Aerofoil 5:

| x % c | $y_u$ % c | $y_l$ % c |
|---|---|---|
| 98.750 | 1.764 | −1.764 |
| 99.250 | 1.394 | −1.394 |
| 99.500 | 1.167 | −1.167 |
| 99.700 | 0.937 | −0.937 |
| 99.900 | 0.559 | −0.559 |
| 100.000 | 0.000 | 0.000 |

U = upper
L = lower

Figure 6:
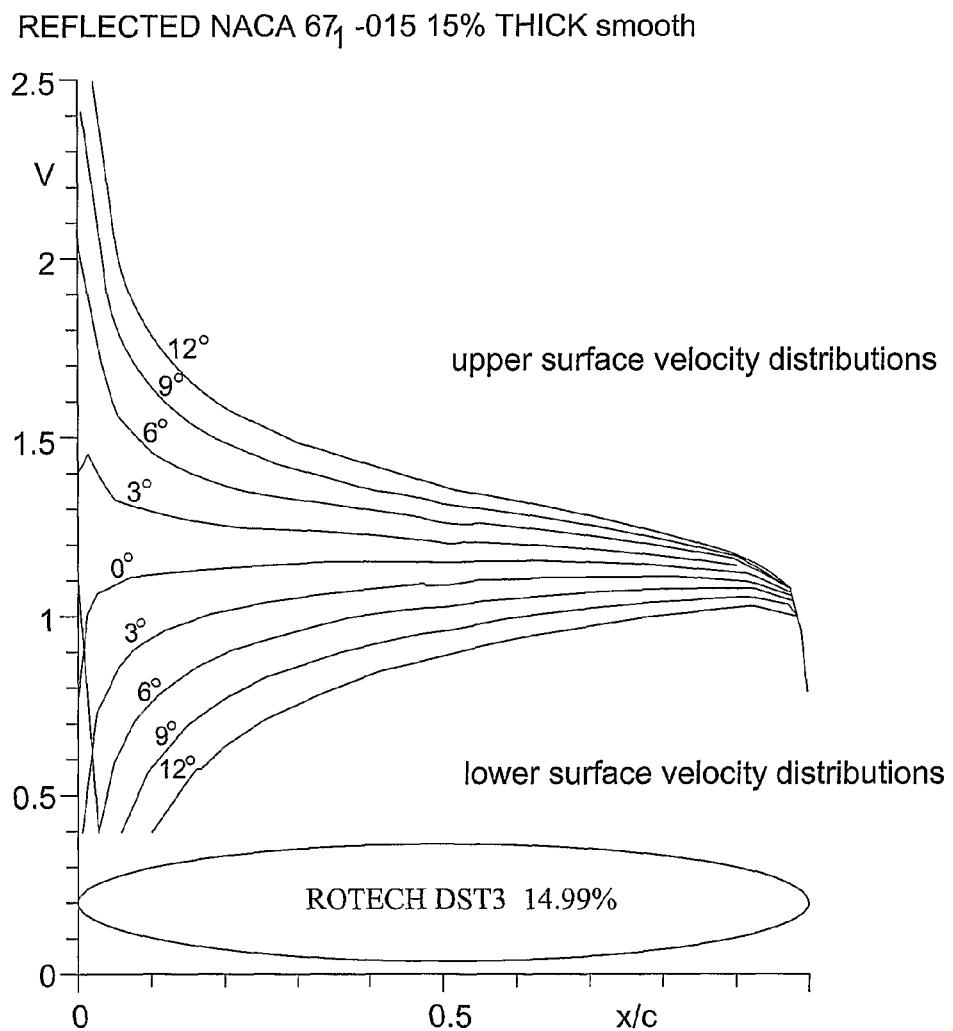
FIG. 6 a graphical representation of velocity distributions at various incidence angles for the aerofoil of FIG. 1.

The aerofoil 5 has been analysed using an Eppler program which calculates the velocity distribution and boundary layer development. At the Reynolds Number of interest, in the range 3 to 10 million, the program predicts no "bubble warnings" and no laminar or turbulent separation. The profile and its predicted velocity distributions at incidence angles from zero to 12 degrees are shown in FIG. 6.

Figure 7:
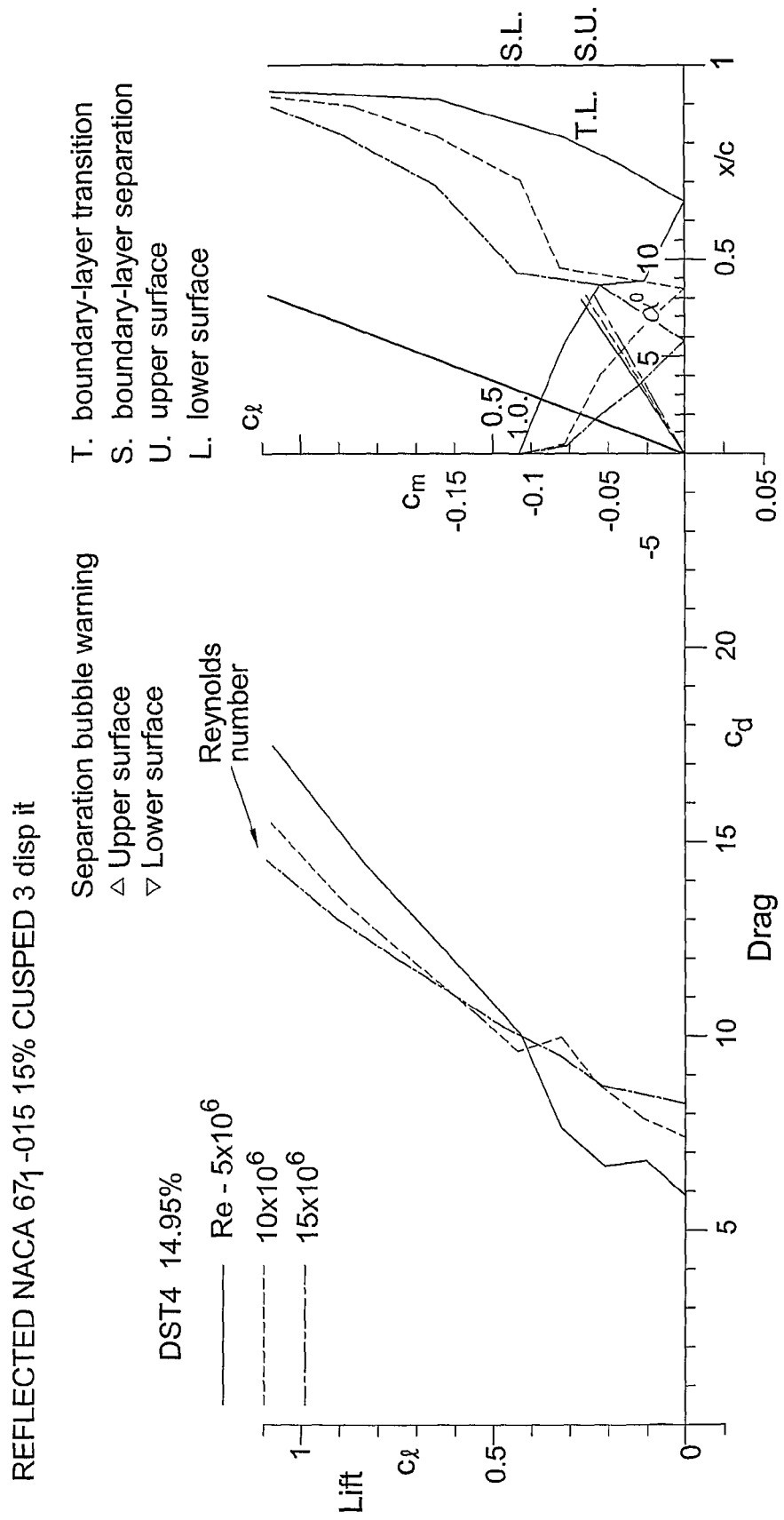
FIG. 7 a graphical representation of predicted behaviour for the aerofoil of FIG. 1.

FIG. 7 shows the results of the Eppler program. The drag coefficient lies below 0.010 at lift coefficients up to 0.5, which corresponds to about 4.5° incidence angle. The results for a 5 million Reynolds Number indicate a laminar flow "drag bucket" with the drag coefficient falling to 0.006 at zero incidence. This effect is stronger at even lower Reynolds Numbers.

The predicted drag coefficients translate into predicted turbine efficiencies of 85% to 90%, although this depends on assumptions made for secondary losses.

Model turbine tests have confirmed that a model ducted turbine using the aerofoil 5 achieved efficiencies of 80% to 85% in both directions, at Reynolds Numbers—based on blade chord—of round 300,000.

The 15% thick aerofoil 5 described here provides a good compromise between structural and aerodynamic efficiency, but there are advantages to choosing other thicknesses in certain circumstances. For example, the turbine blades will benefit from the increased rigidity of a 20% thickness-chord ratio at the root section and a thinner 12% thick form at the tip. There are two ways of achieving such a "family" of similar bi-symmetrical aerofoils.

First, the basic NACA $67_1$-015 thickness form can be scaled to any desired thickness before reflecting the profile about its mid-chord line. The performance of the resulting profile can then be checked using aerofoil and boundary layer analysis software or CFD.

Second, a more sophisticated approach is to use the Eppler program, for example, to design a novel but conventional symmetrical aerofoil having the desired thickness, with its maximum thickness at 50% chord, and then to reflect this profile about its mid-chord. The second method is more reliable because the original NACA profile was designed in a similar fashion and its aerodynamic properties are not necessarily retained when it is simply scaled. The design software ensures a favourable velocity distribution is achieved up to a certain prescribed value of incidence angle.

Figure 8:
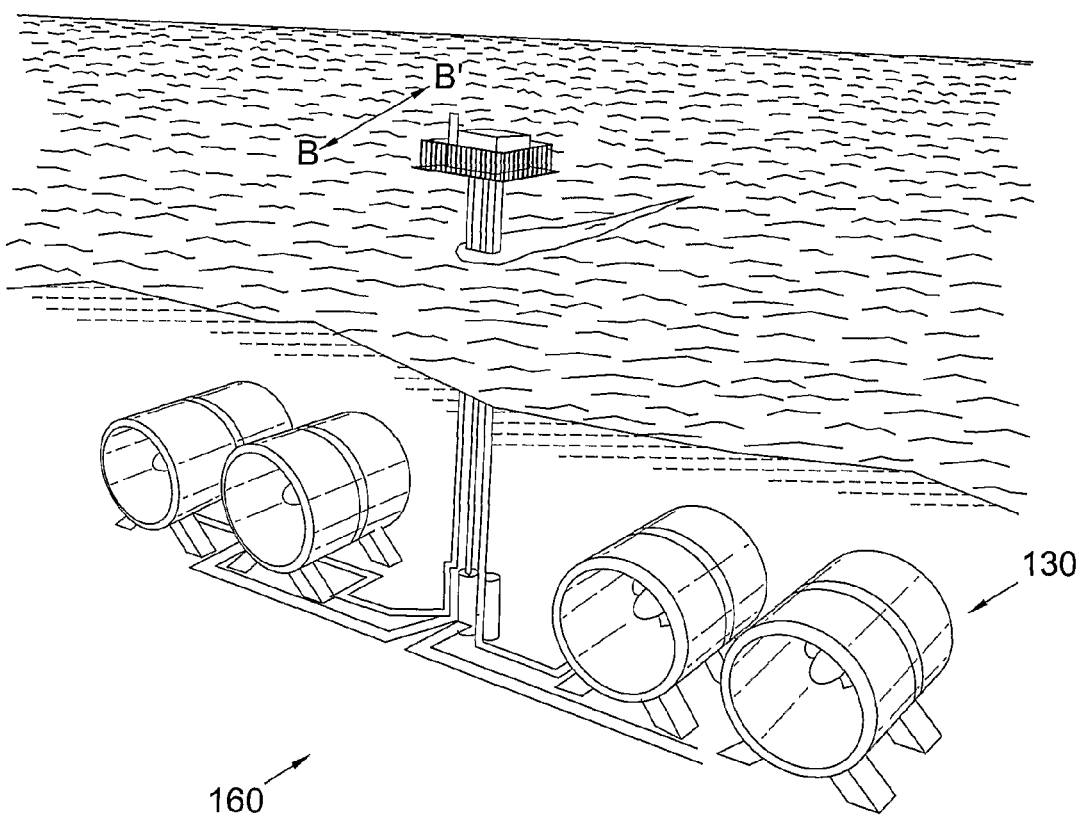
FIG. 8 a schematic view of an underwater power generation apparatus according to a second embodiment of the present invention.
Figure 9:
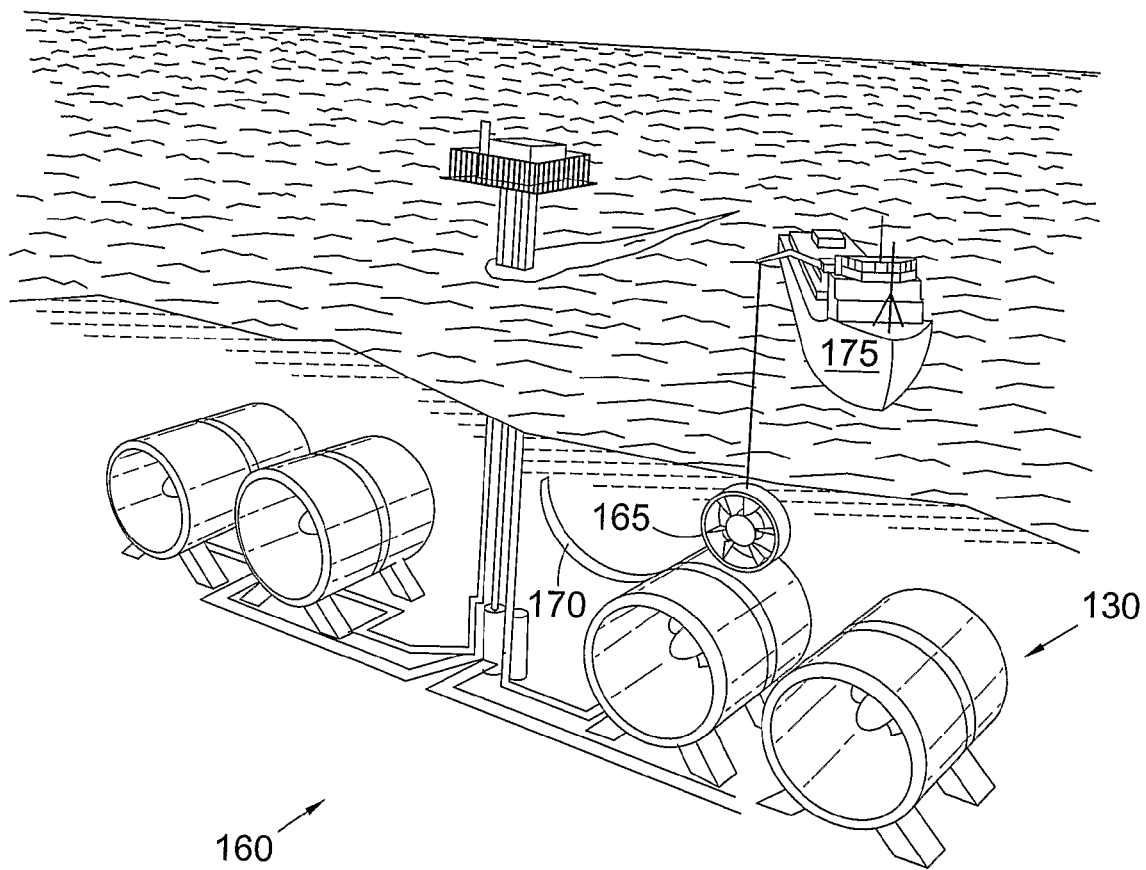
FIG. 9 a schematic view of the underwater power generation apparatus of FIG. 8 during a maintenance procedure.

Referring now to FIGS. 8 and 9, there is shown a power generation apparatus, generally designated 160 according to second embodiment of the present invention. The power generation apparatus 160 comprises a plurality of turbine units 130 and is similar to the power generation apparatus 60 of the first embodiment shown in FIG. 5, including blades (not shown) having the form of the aerofoil 5 of FIG. 1.

However, the turbine units 130 of FIGS. 8 and 9 differ from the turbine units 30 of the power generation apparatus 60 of FIG. 5 in that the turbine units 130 provide a part 165 releasably mountable in the turbine unit 130. The part 165 includes at least one of the turbine and the pump means (not shown). Advantageously, as can be seen from FIG. 9 the part 165 includes at least part of the duct 135. The part 165 is releasable from the turbine unit 130 via an openably closeable part 170. The part 165 can be retrieved to surface by a vessel 175, or the like, for maintenance or replacement purposes and may thereafter be reinstalled or replaced in the turbine unit 130.

The power generation apparatus 160 of FIGS. 8 and 9 therefore resembles the power generation apparatus disclosed in WO 03/029645 A1 (also by the present Applicant), but includes the novel and inventive aerofoil 5 of the present invention.

It will be appreciated that the embodiments of the present invention hereinbefore described are given by way of example only, and are not meant to be limiting of the invention in any way. It will also be appreciated that any one of the disclosed embodiments may optionally include one or more of the features of the invention as recited in the statements of invention.

It will further be appreciated that any one of the disclosed embodiments may be modified to include any one of the features of any of the other disclosed embodiments.

The foregoing embodiments provide ducted turbines which do not need an underwater yawing mechanism but allow the tidal flow to power the turbine in either direction. This is achieved by the novel turbine blade design which provides a relatively high efficiency when operating with flow in either direction. As the turbine blade angle to the axial direction is relatively high, the direction of rotation of the turbine will be reversed when the tidal flow direction changes.

It will also be appreciated that although in the disclosed embodiment the turbine unit has one turbine, it may be envisaged that in variants a turbine unit may have more than one turbine, e.g. in series.

The invention claimed is:

1. An electrical power generation apparatus, comprising at least one underwater turbine unit, the at least one underwater turbine unit comprising at least one turbine that rotates in one direction in response to fluid flow in one direction and in another or counter direction in response to fluid flow in another direction, the at least one turbine comprising at least one blade, the at least one blade comprising a plurality of longitudinally spaced aerofoils, wherein each aerofoil is symmetrical about a mid-chord line thereof and is symmetrical about a chord line thereof and comprises first and second leading edges, each leading edge being part circular in shape, and wherein the at least one blade tapers in a radially outward direction, and wherein the turbine unit further comprises a housing having a fluid flow channel therethrough, the at least one turbine being mounted in the flow channel for rotation in response to fluid flow through the flow channel, and the flow channel comprises a venturi.

2. An electrical power generation apparatus as claimed in claim 1, wherein the power generation apparatus comprises:
   a pump means operatively coupled to the at least one turbine;
   a generator means driven by the turbine, and optionally located separately from the at least one turbine unit; and
   a fluid supply means coupling the pump means to the generator means for supplying fluid from the pump means to the generator means for generating power.

3. An electrical power generation apparatus as claimed in claim 2, wherein the fluid comprises the liquid within which the at least one turbine unit is submerged.

4. An electrical power generation apparatus as claimed in claim 1, wherein the power generation apparatus is adapted to produce electrical power as alternating current/voltage (AC) or direct current/voltage (DC).

5. An electrical power generation apparatus as claimed in claim 1, wherein a chord of the aerofoil at the hub of the turbine is substantially between about 30° and about 60° to an intended direction of fluid flow or axis of rotation of the turbine.

6. An electrical power generation apparatus as claimed in claim 1, wherein the chord line of each aerofoil comprises a straight line.

7. An electrical power generation apparatus as claimed in claim 1, wherein for each aerofoil the mid-chord line is substantially perpendicular to the chord line.

8. An electrical power generation apparatus as claimed in claim 1, wherein a height of each aerofoil is greatest at or around the mid-chord line reducing towards either end.

9. An electrical power generation apparatus as claimed in claim 1, wherein for each aerofoil a ratio of mid-chord line height or thickness to chord line length is about 5% to about 25%.

10. An electrical power generation apparatus as claimed in claim 1, wherein for each aerofoil a ratio of mid-chord line height or thickness to chord line length is about 12% to about 20%.

11. An electrical power generation apparatus as claimed in claim 1, wherein for each aerofoil a ratio of mid-chord line height or thickness to chord length is about 15%.

12. An electrical power generation apparatus as claimed in claim 1, wherein a position of maximum height or thickness of each aerofoil is substantially at the mid-chord line.

13. An electrical power generation apparatus as claimed in claim 1, wherein each aerofoil comprises a bi-symmetrical aerofoil with zero camber and maximum height or thickness at mid-chord.

14. An electrical power generation apparatus as claimed in claim 1, wherein each aerofoil shape comprises a NACA 67.

15. An electrical power generation apparatus as claimed in claim 1, wherein each aerofoil shape comprises a NACA $67_1$-015 leading edge shape reflected about the mid-chord line.

16. An electrical power generation apparatus as claimed in claim 1, wherein the at feast one blade comprises 3 to 9 aerofoils.

17. An electrical power generation apparatus as claimed in claim 1, wherein the at least one blade comprises five aerofoils.

18. An electrical power generation apparatus as claimed in claim 1, wherein a taper ratio of the at least one blade is in the range of about 0.3 to about 0.8.

19. An electrical power generation apparatus as claimed in claim 1, wherein a taper ratio of the at least one blade is about 0.5.

20. An electrical power generation apparatus as claimed in claim 1, wherein an aspect ratio of the at least one blade is in the range of about 3 to about 10.

21. An electrical power generation apparatus as claimed in claim 1, wherein an aspect ratio of the at least one blade is about 6.

22. An electrical power generation apparatus as claimed in claim 1, wherein a hub setting angle of the at least one blade is in the range of about 30° to about 60° from an axial direction.

23. An electrical power generation apparatus as claimed in claim 1, wherein a hub setting angle of the at least one blade is about 45° or about 48°.

24. An electrical power generation apparatus as claimed in claim 1, wherein a tip setting angle of the at least one blade is in the range of about 70° to about 85° from an axial direction.

25. An electrical power generation apparatus as claimed in claim 1, wherein a tip setting angle of the at least one blade is about 79°.

26. An electrical power generation apparatus as claimed in claim 1, wherein a chord length of the at least one blade at mid height is in the range of about 0.3 m to about 3.0 m.

27. An electrical power generation apparatus as claimed in claim 1, wherein a chord length of the at least one blade is about 1.0 m.

28. An electrical power generation apparatus as claimed in claim 1, wherein the at least one blade comprises a plurality of blades.

29. An electrical power generation apparatus as claimed in claim 1, wherein the at least one blade comprises 2 to 9 blades.

30. An electrical power generation apparatus as claimed in claim 1, wherein the at least one blade comprises 3 to 7 blades.

31. An electrical power generation apparatus as claimed in claim 1, wherein the at least one blade comprises 5 or 7 blades.

32. An electrical power generation apparatus as claimed in claim 1, wherein a ratio of hub diameter to tip diameter of the at least one turbine is in the range of about 0.1 to about 0.5.

33. An electrical power generation apparatus as claimed in claim 1, wherein a ratio of hub diameter to tip diameter of the at least one turbine is about 0.2.

34. An electrical power generation apparatus as claimed in claim 1, wherein a tip diameter is in the range of about 5 m to about 30 m.

35. An electrical power generation apparatus as claimed in claim 1, wherein a tip diameter is about 15 m to about 20 m.

36. An electrical power generation apparatus as claimed in claim 1, wherein the at least one turbine is adapted to rotate, in use, at a rate of about 10 to about 50 rpm.

37. An electrical power generation apparatus as claimed in claim 1, wherein the at least one turbine is adapted to rotate, in use, at a rate of about 25 rpm.

38. An electrical power generation apparatus as claimed in claim 1, wherein the venturi comprises a convergent-divergent venturi, tapering from openings at either end of the flow channel towards an inner part of the flow channel.

39. An electrical power generation apparatus as claimed in claim 1, wherein the housing is substantially symmetrical about a mid-point location thereof, and the at least one of the at least one turbine is located substantially thereat.

40. An electrical power generation apparatus as claimed in claim 1, wherein the liquid is provided from a body of water within which the turbine unit is submerged.

41. An electrical power generation apparatus as claimed in claim 1, wherein the housing comprises an outer housing sleeve and an inner housing sleeve, which inner sleeve defines the flow channel.

42. An electrical power generation apparatus as claimed in claim 1, wherein the housing is secured to an underwater surface by a mounting structure, and is optionally substantially aligned with a direction of tidal or current flow.

43. An electrical power generation apparatus as claimed in claim 1, wherein an angle between an axial direction of the housing and a direction of tidal or current flow is about 0° to about 45°.

44. An electrical power generation apparatus as claimed in claim 1, wherein an angle between an axial direction of the housing and a direction of tidal or current flow is about 0°.

45. An electrical power generation apparatus as claimed in claim 1, wherein the turbine unit provides a part releasably mountable in the turbine unit.

46. An electrical power generation apparatus as claimed in claim 1, wherein the part includes at least one of the turbine and the pump means.

47. An electrical power generation apparatus as claimed in claim 1, wherein the turbine unit part includes at least a part of the housing comprising at least part of the flow channel.

48. An electrical power generation apparatus as claimed in claim 1, wherein the turbine unit is driven, in use, in response to fluid flow in either direction through the flow channel.

49. An electrical power generation apparatus as claimed in claim 1, where an inlet and/or outlet diameter of the flow channel or duct is selected from in the range of about 7 m to about 40 m.

50. An electrical power generation apparatus as claimed in claim 1, wherein a maximum diameter of the flow channel is about 20 m.

51. An electrical power generation apparatus as claimed in claim 1, wherein a length of the flow channel is in the range of about 7 m to about 50 m.

52. An electrical power generation apparatus as claimed in claim 1, wherein a length of the flow channel is about 28 m.

53. A method of generating power comprising the steps of:
providing an electrical power generation apparatus comprising at least one underwater turbine unit, the at least one underwater turbine unit comprising at least one turbine that rotates in one direction in response to fluid flow in one direction and rotates in another or counter direction in response to fluid flow in another direction, the at least one turbine comprising at least one blade, the at least one blade comprising a plurality of longitudinally spaced aerofoils, wherein each aerofoil is symmetrical about a mid-chord line thereof and is symmetrical about a chord line thereof and comprises first and second leading edges, each leading edge being part circular in shape, and wherein the at least one blade tapers in a radially outward direction, and wherein further the turbine unit comprises a housing having a fluid flow channel therethrough, the at least one turbine being mounted in the flow channel for rotation in response to fluid flow through the flow channel, and the flow channel comprises a venturi;
locating the at least one turbine unit of the electrical power generation apparatus underwater;
causing the at least one turbine of the at least one turbine unit to rotate in response to fluid flow in at least one direction.

54. A method of generating power as claimed in claim 53, wherein the at least one turbine unit is located on, near, or above one of: a sea bed, ocean floor, or river bed.

55. A method of generating power as claimed in claim 53, wherein the fluid flow comprises tidal flow, or current flow.

56. A method of generating power as claimed in claim 53, wherein the one direction and the another direction of fluid are substantially opposed in direction.

57. A power generation apparatus comprising at least one underwater turbine unit, the at least one underwater turbine unit comprising at least one turbine that rotates in one direction in response to fluid flow in one direction and rotates in another or counter direction in response to fluid flow in another direction, the at least one turbine comprising at least one blade, the at least one blade comprising a plurality of aerofoils which are spaced along a length of the at least one blade and between a hub and a tip of the at least one blade, wherein each aerofoil is of a fixed shape which is symmetrical about a mid-chord line thereof and which is symmetrical about a chord line thereof, and wherein each aerofoil comprises first and second leading edges, and first and second leading edges of adjacent aerofoils are joined so as to provide respective continuous first and second leading edges of the at least one blade, and further wherein the at least one blade is twisted between the hub and tip thereof.

58. A power generation apparatus as claimed in claim 57, wherein the at least one turbine unit includes a housing having a fluid flow channel therethrough, the at least one turbine being mounted in the flow channel for rotation in response to fluid flow through the flow channel.

59. A power generation apparatus as claimed in claim 57, wherein a chord of the aerofoil at the hub of the turbine is substantially between about 30° and about 60° to an intended direction of fluid flow or axis of rotation of the turbine.

60. A power generation apparatus as claimed in claim 57, wherein each leading edge is part circular in shape.

61. A power generation apparatus as claimed in claim 57, wherein the chord line of each aerofoil comprises a straight line.

62. A power generation apparatus as claimed in claim 57, wherein for each aerofoil the mid chord-line is substantially perpendicular to the chord line.

63. A power generation apparatus as claimed in claim 57, wherein a height of each aerofoil is greatest at or around the mid-chord line reducing towards either end.

64. A power generation apparatus as claimed in claim 57, wherein for each aerofoil a ratio of mid-chord line height or thickness to chord line length is around about 5% to about 25%.

65. A power generation apparatus as claimed in claim 57, wherein for each aerofoil a ratio of mid-chord line height or thickness to chord line length is about 12% to about 20%.

66. A power generation apparatus as claimed in claim 57, wherein for each aerofoil a ratio of mid-chord line height or thickness to chord length is about 15%.

67. A power generation apparatus as claimed in claim 57, wherein a position of maximum height or thickness of each aerofoil is substantially at the mid-chord line.

68. A power generation apparatus as claimed in claim 57, wherein each aerofoil comprises a bi-symmetrical aerofoil with zero camber and maximum height or thickness at mid-chord.

69. A power generation apparatus as claimed in claim 57, wherein each aerofoil shape comprises a NACA 67.

70. A power generation apparatus as claimed in claim 57, wherein each aerofoil shape comprises a NACA $67_1$-015, leading edge shape reflected about the mid-chord line.

71. A power generation apparatus as claimed in claim 57, wherein the at least one blade comprises 3 to 9 aerofoils.

72. A power generation apparatus as claimed in claim 57, wherein the at least one blade comprises five aerofoils.

73. A power generation apparatus as claimed in claim 57, wherein a taper ratio of the at least one blade is in the range of about 0.3 to about 0.8.

74. A power generation apparatus as claimed in claim 57, wherein a taper ratio is around about 0.5.

75. A power generation apparatus as claimed in claim 57, wherein an aspect ratio of the at least one blade is in the range of about 3 to about 10.

76. A power generation apparatus as claimed in claim 57, wherein an aspect ratio of the at least one blade is around 6.

77. A power generation apparatus as claimed in claim 57, wherein a hub setting angle of the at least one blade is in the range of about 30° to about 60° from an axial direction.

78. A power generation apparatus as claimed in claim 57, wherein a hub setting angle of the at least one blade is about 45° or about 48°.

79. A power generation apparatus as claimed in claim 57, wherein a tip setting angle of the at least one blade is in the range of about 70° to about 85° from an axial direction.

80. A power generation apparatus as claimed in claim 57, wherein a tip setting angle of the at least one blade is about 79°.

81. A power generation apparatus as claimed in claim 57, wherein a chord length of the at least one blade at mid height is in the range about 0.3 m to about 3.0 m.

82. A power generation apparatus as claimed in claim 57, wherein a chord length of the at least one blade is about 1.0 m.

83. A power generation apparatus as claimed in claim 57, wherein the at least one blade comprises a plurality of blades.

84. A power generation apparatus as claimed in claim 83, wherein the at least one blade comprises 2 to 9 blades.

85. A power generation apparatus as claimed in claim 83, wherein the at least one blade comprises 3 to 7 blades.

86. A power generation apparatus as claimed in claim 83, wherein the at least one blade comprises 5 or 7 blades.

87. A power generation apparatus as claimed in claim 83, wherein a ratio of hub diameter to tip diameter of the at least one blade is in the range of about 0.1 to about 0.5.

88. A power generation apparatus as claimed in claim 83, wherein a ratio of hub diameter to tip diameter of the at least one blade is about 0.2.

89. A power generation apparatus as claimed in claim 83, wherein a tip diameter is in the range of about 5 m to about 30 m.

90. A power generation apparatus as claimed in claim 83, wherein a tip diameter is about 15 m to about 20 m.

91. A power generation apparatus as claimed in claim 83, wherein the turbine is adapted to rotate, in use, at a rate of about 10 to about 50 rpm.

92. A power generation apparatus as claimed in claim 83, wherein the turbine is adapted to rotate, in use, at a rate of about 25 rpm.

93. A power generation apparatus as claimed in claim 58, wherein the flow channel comprises a venturi comprising a convergent-divergent venturi, tapering from openings at either end of the flow channel towards an inner part of the flow channel.

94. A power generation apparatus as claimed in claim 59, wherein the housing is substantially symmetrical about a mid-point location thereof, and the at least one of the at least one turbine is located substantially thereat.

95. A power generation apparatus as claimed in claim 93, wherein the liquid is provided from a body of water within which the turbine unit is submerged.

96. A power generation apparatus as claimed in claim 93, wherein the turbine housing comprises an outer housing sleeve and an inner housing sleeve, which inner sleeve defines the flow channel.

97. A power generation apparatus as claimed in claim 93, wherein the housing is secured to an underwater surface by a mounting structure and is optionally substantially aligned with a direction of tidal or current flow.

98. A power generation apparatus as claimed in claim 93, wherein an angle between an axial direction of the housing and a direction of tidal or current flow is about 0° to about 45°.

99. A power generation apparatus as claimed in claim 93, wherein an angle between an axial direction of the housing and a direction of tidal or current flow is about 0°.

100. A power generation apparatus as claimed in claim 93, wherein the turbine unit provides a part releasably mountable in the turbine unit.

101. A power generation apparatus as claimed in claim 57, wherein the turbine unit is driven, in use, in response to fluid flow in either direction through the flow channel.

102. A power generation apparatus as claimed in claim 58, where an inlet and/or outlet diameter of the flow channel or duct is selected from in the range of about 7 m to about 40 m.

103. A power generation apparatus as claimed in claim 58, wherein a length of the flow channel or duct is in the range of about 7 m to about 50 m.

104. A power generation apparatus as claimed in claim 57, wherein the power generation apparatus comprises an electrical power generator.

105. A power generation apparatus as claimed in claim 104, wherein the power generation apparatus is adapted to produce electrical power as alternating current/voltage (AC) or direct current/voltage (DC).

106. A method of generating power comprising the steps of:
   providing a power generation apparatus comprising at least one underwater turbine unit, the at least one underwater turbine unit comprising at least one turbine that rotates in one direction in response to fluid flow in one direction and rotates in another or counter direction in response to fluid flow in another direction, the at least one turbine comprising at least one blade, the at least one blade comprising a plurality of aerofoils which are spaced along a length of the at least one blade and between a hub and a tip of the at least one blade, wherein each aerofoil is of a fixed shape which is symmetrical about a mid-chord line thereof and which is symmetrical about a chord line thereof, and wherein each aerofoil comprises first and second leading edges, and first and second leading edges of adjacent aerofoils are joined so as to provide respective continuous first and second leading edges of the at least one blade, and further wherein the at least one blade is twisted between the hub and tip thereof;
   locating the at least one turbine unit of the power generation apparatus underwater;
   causing the at least one turbine of the at least one turbine unit to rotate in response to fluid flow in at least one direction.

107. A method of generating power as claimed in claim 106, wherein the at least one turbine unit is located on, near, or above one of: a sea bed, ocean floor, or river bed.

108. A method of generating power as claimed in claim 106, wherein the fluid flow comprises tidal flow or current flow.

* * * * *